(12) United States Patent
Sinclair

(10) Patent No.: US 7,403,191 B2
(45) Date of Patent: Jul. 22, 2008

(54) TACTILE OVERLAY FOR AN IMAGING DISPLAY

(75) Inventor: Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 10/767,291

(22) Filed: Jan. 28, 2004

(65) Prior Publication Data

US 2005/0164148 A1    Jul. 28, 2005

(51) Int. Cl.
*G06F 3/041* (2006.01)
*G06F 3/02* (2006.01)
*G09G 5/00* (2006.01)

(52) U.S. Cl. .................................. 345/173; 345/168
(58) Field of Classification Search ......... 345/173–178, 345/168, 169
See application file for complete search history.

(56) References Cited

U.S. PATENT DOCUMENTS

| | | |
|---|---|---|
| 4,333,092 A | 6/1982 | Field |
| 4,406,998 A | 9/1983 | Willough |
| 5,086,287 A | 2/1992 | Nutzel |
| 5,154,614 A | 10/1992 | Matsuoka et al. |
| 5,165,897 A | 11/1992 | Johnson |
| 5,186,629 A | 2/1993 | Rohen |
| 5,233,333 A | 8/1993 | Borsuk |
| 5,272,470 A | 12/1993 | Zetts |
| 5,412,189 A | 5/1995 | Cragun |
| 5,568,536 A | 10/1996 | Tiller et al. |
| 5,580,254 A | 12/1996 | Ramsey |
| 5,588,839 A | 12/1996 | Shimoda |
| 5,590,373 A | 12/1996 | Whitley et al. |
| 5,619,684 A | 4/1997 | Goodwin et al. |
| 5,729,394 A * | 3/1998 | Sevier et al. ............... 359/726 |
| 5,748,177 A | 5/1998 | Baker et al. |
| 5,757,361 A | 5/1998 | Hirshik |
| 5,805,138 A | 9/1998 | Brawne et al. |
| 5,810,597 A | 9/1998 | Allen, Jr. et al. |
| 5,821,881 A * | 10/1998 | Fischer et al. ............... 341/22 |
| 5,835,080 A | 11/1998 | Beeteson et al. |
| 5,874,955 A | 2/1999 | Rogowitz et al. |
| 5,909,211 A | 6/1999 | Combs et al. |
| 5,920,303 A | 7/1999 | Baker et al. |

(Continued)

OTHER PUBLICATIONS

"Touch-Sensitive Overlay with Tactile Feedback", IBM Disclosure Bulletin, pp. 761-763, vol. 29, No. 2, Jul. 1986.

(Continued)

*Primary Examiner*—Bipin Shalwala
*Assistant Examiner*—Steven E Holton
(74) *Attorney, Agent, or Firm*—Lee & Hayes, PLLC

(57) ABSTRACT

A tactile overlay for a touchscreen includes one or more button structures, a flexible resilient membrane, and one or more nibs corresponding to the one or more button structures. The overlay is disposed over and in propinquity with the touchscreen display, with button and corresponding nib structure(s) of the overlay corresponding to virtual buttons that are displayed by the touchscreen display. The button structure(s) and corresponding nibs are positioned on the overlay so that a user can press a button structure, which causes the corresponding nib to touch a desired virtual button being displayed by the touchscreen display. The flexible resilient layer causes the nib to return to original position, breaking contact with the touchscreen display.

17 Claims, 3 Drawing Sheets

U.S. PATENT DOCUMENTS

| | | | |
|---|---|---|---|
| 5,936,614 | A | 8/1999 | An et al. |
| 5,989,099 | A | 11/1999 | Arnold, III et al. |
| 6,042,383 | A | 3/2000 | Herron |
| 6,059,575 | A | 5/2000 | Murphy |
| 6,088,805 | A | 7/2000 | Davis et al. |
| 6,141,754 | A | 10/2000 | Choy |
| 6,162,059 | A | 12/2000 | Murphy et al. |
| 6,217,338 | B1 | 4/2001 | Tieman |
| 6,233,576 | B1 | 5/2001 | Lewis |
| 6,259,043 | B1 | 7/2001 | Clary et al. |
| 6,262,718 | B1 | 7/2001 | Findlay et al. |
| 6,267,598 | B1 | 7/2001 | Allen, Jr. et al. |
| 6,278,944 | B1 | 8/2001 | Lui et al. |
| 6,292,713 | B1 | 9/2001 | Jouppi et al. |
| 6,292,904 | B1 | 9/2001 | Broomhall et al. |
| 6,308,173 | B1 | 10/2001 | Glasser et al. |
| 6,320,496 | B1 | 11/2001 | Sokoler et al. |
| 6,351,748 | B1 | 2/2002 | Deen et al. |
| 6,357,940 | B1 | 3/2002 | Murphy |
| 6,381,602 | B1 | 4/2002 | Shoroff et al. |
| 6,384,743 | B1 | 5/2002 | Vanderheiden |
| 6,412,070 | B1 | 6/2002 | Van Dyke et al. |
| 6,446,206 | B1 | 9/2002 | Feldbaum |
| 6,449,633 | B1 | 9/2002 | Van et al. |
| 6,473,103 | B1 | 10/2002 | Bailey et al. |
| 6,492,978 | B1 * | 12/2002 | Selig et al. ............ 345/173 |
| 6,513,721 | B1 | 2/2003 | Salmre et al. |
| 6,581,099 | B1 | 6/2003 | Deen et al. |
| 6,609,199 | B1 | 8/2003 | DeTreville |
| 6,776,546 | B2 * | 8/2004 | Kraus et al. ............ 400/472 |
| 7,079,119 | B2 * | 7/2006 | Hanson et al. ........... 345/175 |
| 7,116,313 | B2 * | 10/2006 | Nasu ....................... 345/173 |
| 2003/0095110 | A1 * | 5/2003 | Ukita et al. ............. 345/173 |
| 2003/0134256 | A1 | 7/2003 | Tretlakoff et al. |

OTHER PUBLICATIONS

McMath, et al., "High Sampling Resolution Tactile Sensor for Object Recognition", IEEE Instrumentation and Measurement Technology Conference, pp. 579-583, vol. 29, No. 2, May 18-20, 1993.

Yeung et al., "High Sampling Resolution Tactile Sensor for Object Recognition", IEEE Transactions on Instrumentation and Measurement Conference, pp. 277-282, vol. 43, No. 2, Apr. 1994.

Timothy Griffin, "Haptic Feedback in Button Technologies: A Guide for Industrial Designers", http://tim.griffins.ca/writings/haptic_tech_body.html; pp. 1-47, Apr. 14, 1999.

"Automated Home . . . The Hows, Wheres and Whys of HA in the UK (Est. 1996)", www.automatedhome.co.uk, PDA-ir Review, pp. 1-8, May 24, 2002.

Gerovichev et al., "The Effect of Visual and Haptic Feedback on Manual and teleoperated Needle Insertion", Lecture Notes in Computer Science, Proceedings Part 1, pp. 147-154, vol. 2488, Sep. 25-28, 2002.

"TV Remote Controller 5.5 (voice operated)—reduced price!", www.pdawin.com/tvremote.html, pp. 1-4 Aug. 2003.

"SoftFlow Version 3.0-Appliation Programming Manual", Delta Systems, Inc., www.delta-systems-inc.com, Stone Ridge Publishing, Inc., pp. 1-8, Aug. 2003.

S.D. Laycock and A.M. Day, "Recent Developments and Applications of Haptic Devices", Computer Graphics Forum, EG Eurographics Digital Library, pp. 117-132, vol. 22, No. 2, 2003.

* cited by examiner

TACTILE OVERLAY FOR AN IMAGING DISPLAY

FIELD

Various embodiments described below relate generally to displays for mobile electronic devices, more particularly but not exclusively to, overlays for touchscreen displays for mobile electronic devices.

BACKGROUND

Some mobile or handheld electronic devices (e.g., personal digital assistants or PDAs, tablet personal computer or tablet PC, etc.) typically include hardware buttons and a touchscreen. The touchscreen can be used to display a "virtual" keypad, keyboard or other input mechanism graphics (also referred to herein as "virtual buttons") that can be activated by the user (e.g., by using a finger to press a button) to perform input functions.

Due to the small size and power saving designs of typical mobile electronic devices, such devices generally have some undesirable limitations. For example, a typical mobile electronic device's display is relatively small, forcing the displayed virtual buttons to be relatively small, which tends to increase a user's difficulty in using a finger to pressing a virtual button. Thus, many such mobile electronic devices suggest the use of (and may even provide) a stylus so that the user can accurately activate the desired virtual button. Also, the user generally has to look at the display in order to activate the desired virtual button (as opposed to hardware buttons that may be identified tactilely in some applications) because there are no tactile indications of the boundaries between the virtual buttons. In addition, to save power, the display's backlight may be turned off for significant periods of time (e.g., when the mobile electronic device has not been used for a selected time period). When the backlight is turned off, a user may have difficulty seeing the virtual buttons.

SUMMARY

In accordance with aspects of the various described embodiments, a tactile overlay for a touchscreen display is provided. For example, in one application the touchscreen display is part of a mobile electronic device such as a PDA. In one aspect, the overlay includes one or more button structures, a flexible resilient layer (also referred to herein as a membrane), and one or more nibs corresponding to the one or more button structures. The overlay is disposed over and in propinquity with the touchscreen display, with button and corresponding nib structure(s) of the overlay corresponding to virtual buttons that are displayed by the touchscreen display. The button structure(s) and corresponding nibs are positioned on the overlay so that a user can press a button structure, which causes the corresponding nib to touch a desired virtual button being displayed by the touchscreen display, as if being touched by a stylus. The flexible resilient layer causes the nib to return to original position, breaking contact with the touchscreen display. This aspect can advantageously allow a user to accurately operate the virtual buttons without having to look at the touchscreen display.

In some embodiments, the button structure(s), membrane and nib(s) of the overlay are made of a translucent material so that a user may see virtual buttons displayed by the underlying touchscreen display initially, and then rely on the sense of touch to operate the virtual buttons afterwards.

In another aspect, the button structure(s) of the overlay include haptic structures that provide tactile feedback and/or sounds (e.g., a "click" sound) that allow a user to know that the button structure was pressed.

In another aspect, the overlay includes button structures in the form of a QWERTY keyboard. This overlay can be advantageously used with mobile electronic devices that are configured with a virtual QWERTY keyboard.

In yet another embodiment, the overlay includes a lighting device that can be used to illuminate the button structures so that a user can see the button structures under low-light conditions.

In still another embodiment, the overlay includes a redirector that can be positioned over the infrared port of some mobile electronic devices. The redirector is used to change the direction of the infrared beam so that a user can simultaneously view the button structure(s) of the overlay while directing an infrared beam toward a desired target (e.g., an appliance that can be remotely controlled by the mobile electronic device via an infrared beam).

In another embodiment, the overlay includes a captive slider button with a respective nib such that when the user actuates the slider button by pressing and sliding it, the nib in turn actuates a virtual slider on the touch screen display.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
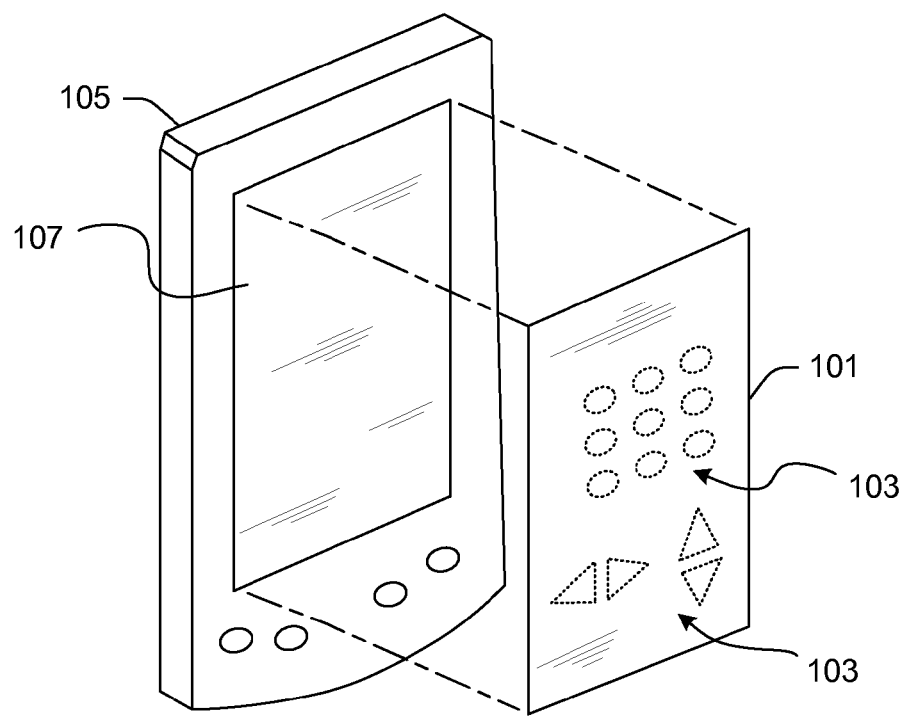
FIG. 1 is a perspective diagram illustrating a mobile electronic device and an overlay according to one embodiment.
Figure 1A:
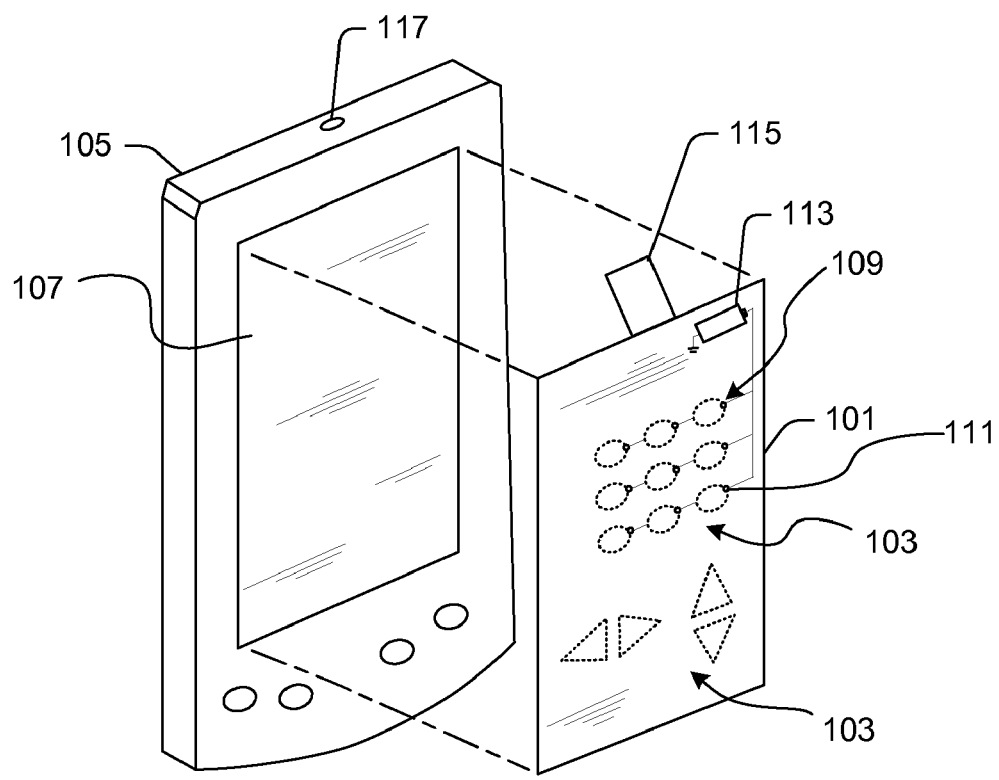

FIG. 1 illustrates an embodiment of an overlay 101, which has button structures 103 extending from one of its surfaces. In the illustrated example, overlay 101 is to be used as an accessory to a mobile or handheld electronic device 105 having a touchscreen display 107. Button structures 103 have corresponding nibs (see FIG. 2) on the surface of overlay 101 that faces electronic device 105.

Figure 2:
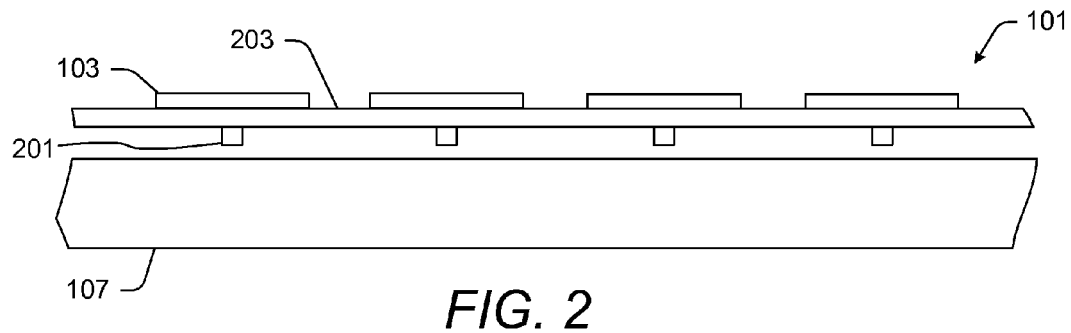
FIG. 2 is a side elevation illustrating a portion of the mobile electronic device and the overlay operationally coupled to the mobile electronic device.

The portion of overlay 101 illustrated in FIG. 2 shows a button structure 103 with a nib 201, both formed on a flexible and resilient layer or membrane 203. Button structures 103 can be sized so that a finger can easily press a button structure without inadvertently pressing a neighboring button structure. The nibs 201 can be relatively smaller (e.g., having a contact point on touchscreen display 107 similar in size to that of a stylus).

In one embodiment, membrane 203 is made from a clear polycarbonate material that provides adequate flexibility and resiliency, and the button structures 103 and nibs 201 are made from a clear acrylic material. In this embodiment, button structures 103 and nibs 201 are attached to membrane 203 using a suitable adhesive (e.g., acrylic cement solvent). This embodiment allows a user to view the underlying virtual buttons through these translucent materials. In other embodiments, the same material can be used to implement the membrane, button structures and nibs. In still other embodiments, different materials can be used to implement the membrane, button structures and nibs of overlay 101.

In still other embodiments, membrane 203 may be implemented using a fiber optic plate; e.g., a plate that resembles a slice taken from a bundle of a large number of parallel touching optical fibers, the slice being taken perpendicularly from the longitudinal axis of the bundle. The fiber optic plate in effect implements a large number of parallel waveguides that direct light from one side of the plate to the other.

Referring again to FIG. 1, the example electronic device 105 is a so-called personal digital assistant or PDA. In other applications, electronic device 105 can be a cellular telephone with touchscreen display, a tablet personal computer (PC), a remote control for an appliance, and the like. Touchscreen display 107 is typically used to display virtual buttons that allow a user to perform input functions on electronic device 105.

Overlay 101 is attached to electronic device 105 in any suitable manner. For example, many mobile electronic devices have its touchscreen display recessed so that overlay 101 may be press fitted into the recess. In other embodiments, overlay 101 may be part of or inserted into a sleeve into which electronic device 105 may be inserted. Similarly, overlay 101 may be part of or inserted into a cover that is attached to the body of electronic device 105. In a similar manner, overlay 101 may be formed as part of a replacement faceplate designed for electronic device 105. Similar sleeves, covers and faceplates are commercially available for some electronic devices and can be modified to accept or incorporate an overlay. In other embodiments, adhesive and/or mechanical fasteners (e.g., screws) may be used to attach overlay 101 to electronic device 105. In still other embodiments, a mechanical attachment means (e.g., clips, Velcro® or Gecko Tape™, etc.) can be used to removably attach overlay 101 to electronic device 105. In this embodiment, overlay 101 is attached to electronic device 105 so that none of the nibs 201 (FIG. 2) contact touchscreen display 107 unless a button structure is pressed. In this embodiment, the nibs 201 are located on overlay 101 so that they are substantially centered on a corresponding virtual button to be displayed by touchscreen display 107 (e.g., see FIG. 3).

A user can use overlay 101 to accurately operate virtual button displayed by touchscreen display 107 under limiting circumstances (e.g., large fingers, low-light conditions, etc. as described above). For example, in one application, overlay 101 is operationally coupled to mobile electronic device 105 so that a user can press the button structures 103 to operate virtual buttons displayed by touchscreen display 107. The overlay is formed so that when a user presses a button structure 103, the corresponding nib 201 (FIG. 2) moves or extends from the surrounding portion of the overlay to contact the desired virtual button. In one embodiment, each nib moves or extends away from the surrounding portion of the overlay substantially independently of other nibs so that only the desired virtual button is pressed. When the user stops pressing the button structure, the resiliency of membrane 203 causes the nib to move away from (thereby breaking contact with) the surface of touchscreen display 107. The button structures 103 provide a means that advantageously allows a user to accurately operate the virtual buttons by touch, reducing the need to look at the virtual buttons being displayed by the touchscreen display 107.

In an alternative embodiment, button structures 103 are made using haptic technology to provide a further indication (e.g., a "click" or other sound and/or feel) that a button was pressed. Suitable haptic devices are commercially available (e.g., those used in some keypads). The audio/mechanical feedback provided by haptic devices provides confirmation that the button structure was correctly pressed, which is desirable to many users.

In another embodiment, overlay 101 is configured so that button structures 103 are in the form of a QWERTY keyboard. This overlay can be advantageously used with electronic devices that do not have enough space for a hardware QWERTY keyboard. A user that wishes to use a QWERTY keyboard to input data into such an electronic device can obtain software that implements a virtual QWERTY keyboard along with a "QWERTY" overlay 101.

In yet another embodiment, overlay 101 includes a lighting device 109 that can be used to illuminate the button structures so that a user can see the button structures under low-light conditions. For example, overlay 101 can include a light emitting diode (LED) 111 and a power source 113 (e.g., a battery) that is configured to provide edge lighting of the overlay. In one embodiment, the power source 113 can be turned on and off using one of the button structures of the overlay.

Figure 3:
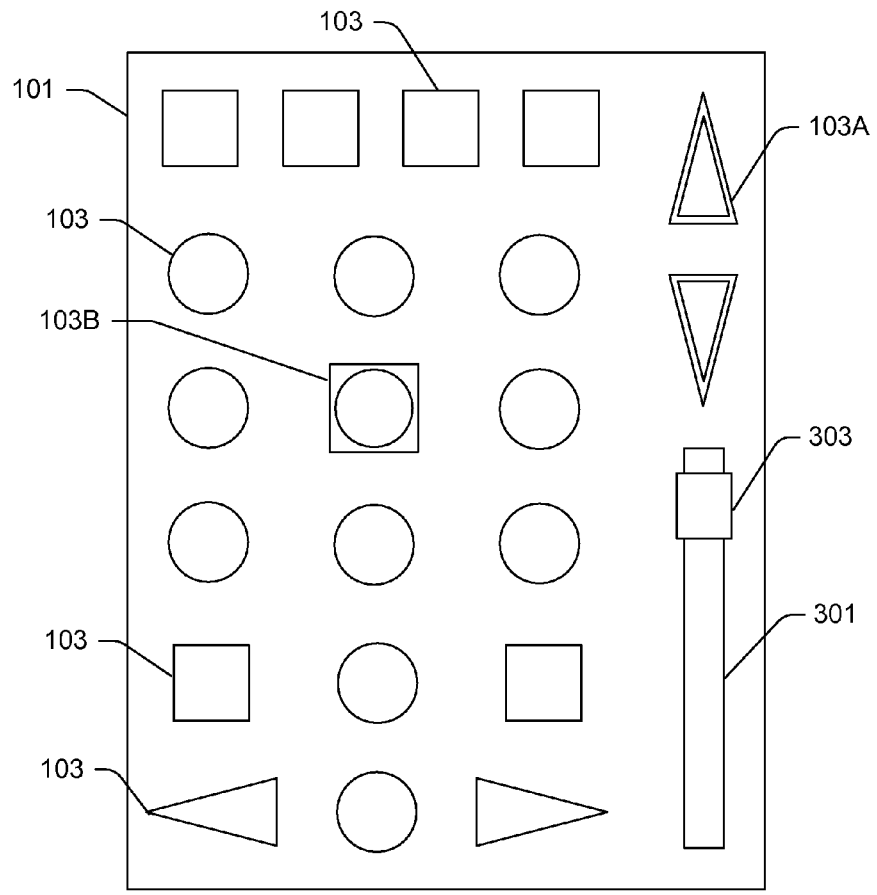
FIG. 3 is a diagram illustrating a button structure layout of an overlay, according to one embodiment.

In another embodiment, overlay 101 includes a cutout slot 301 as illustrated in FIG. 3 that houses a slider button 303 on the top side and a respective nib on the other side such that the slider button is captive and is forced to move only along the slot 301 and up and down similar to the other buttons. When the user actuates the slider button 303 by pressing and sliding it, the nib in turn actuates a virtual slider on the touch screen display.

EXAMPLE APPLICATION OF TACTILE OVERLAY

In one application, overlay 101 is used as an accessory to improve the performance of a PDA device (with infrared port) that is configured to operate as a remote control for one or more appliances (e.g., a television, video cassette recorder, a stereo, etc.). In one embodiment, the PDA device is configured with universal remote controller software package such as, for example, "TV Remote Controller 5.5", which is available from PDAwin.com. In this embodiment, a user can program a desired virtual button arrangement using this software. For example, in one embodiment, a user can arrange the virtual buttons to correspond to the button structures of the overlay illustrated in FIG. 3 (described further below). The software enables the PDA device to operate as a universal remote control for various household appliances.

FIG. 3 illustrates a button structure layout of overlay 101, according to one embodiment. In this embodiment, button structures 103 include button structures that have a raised portion 103A that a user can discern by sense of touch. The raised portion of the button structure can be used to differentiate one set of similar button structures from another set. For example, in the layout of FIG. 3, the top pair of triangular button structures on the right side of overlay 101 have raised portions 103A to indicate that the top set is used for a preselected function (e.g., to change channels). On the other hand, the lower pair of triangular button structures 103 on the right side of overlay 101 do not have raised portions to indicate that the bottom set is used for a different preselected function (e.g., to change volume). In addition, in this embodiment, button structures 103 include a button structure that has a circular ridge 103B that can be used to indicate the position of that button structure relative to other associated button structures (e.g., the middle numeric "key" of a numeric keypad). In other embodiments, different topographic features can be formed in selected button structures to provide indications for particular functions, locations or other selected parameter.

These topographic features can advantageously help a user to press desired button structures without having to look at the overlay. This feature can be advantageous for users that like to point the IR port of the PDA device at the desired appliance when changing a channel, volume, etc.

In an alternative embodiment, overlay 101 includes a redirector 115 that is positioned over the infrared port 117 of the PDA device. The redirector is used to change the direction of the infrared beam 117 so that a user can simultaneously view the button structure(s) of the overlay while directing an infrared beam toward a desired appliance. For example, in one embodiment the redirector 115 could be implemented using a fiber optic plate (similar to that described above) with a bend in the optical fiber segments that form the plate. In such an embodiment, the overlay can be formed so that the redirector 115 resembles a flange-like structure at the top side of the overlay, whereby the redirector covers the IR port of the PDA device. Other optical structures (e.g., a mirror, prism, etc.) can be used to implement the redirector 115 in other embodiments.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the embodiments being described.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. An apparatus, comprising:
   a membrane including a fiber optic plate configured to direct light from a first side of the membrane to a second side opposite the first side, the first side positioned adjacent to a touchscreen display;
   a button structure disposed on the second side of the membrane; and
   a nib corresponding to the button structure and disposed on the first side of the membrane, wherein the apparatus is configured to be operatively coupled to the touchscreen display so that when a user applies a force to the button structure the nib contacts the touchscreen display so as to activate a virtual button being displayed by the touchscreen display.

2. The apparatus of claim 1, wherein the membrane comprises a flexible and resilient material.

3. The apparatus of claim 1, wherein the button structure comprises a translucent portion.

4. The apparatus of claim 1, wherein the button structure is configured as a remote control.

5. The apparatus of claim 1, wherein the button structure comprises a haptic structure configured to emit an audible sound.

6. The apparatus of claim 1, wherein the button structure is one of a plurality of button structures disposed on the membrane, wherein the plurality of button structures implement a QWERTY keyboard.

7. The apparatus of claim 1, further comprising a lighting device to selectively illuminate the button structure, the lighting device including at least one light emitting diode (LED) and a power source.

8. The apparatus of claim 1, further comprising a redirector to change a direction of an infrared beam directed onto the redirector.

9. The apparatus of claim 1, wherein the membrane is sized to be press fitted into a recessed portion of a mobile electronic device, wherein the membrane is disposed within the recess to position the nib in propinquity with the touchscreen display.

10. The apparatus of claim 1, further comprising a sleeve to contain a mobile electronic device that includes the touchscreen display, wherein the sleeve is to position the nib in propinquity with the touchscreen display.

11. The apparatus of claim 1, wherein the button structure and nib are slidably fitted to a guide slot in the membrane, the guide slot constraining the button structure and nib along a guide slot path.

12. An apparatus to be operatively coupled to a touchscreen display for operating a virtual button displayed by the touchscreen display, the apparatus comprising:
   a membrane, wherein the membrane comprises a fiber optic plate; and
   tactile means, coupled to the membrane, for selectively contacting a touchscreen display at a desired location in response to a force exerted on the tactile means by a user, wherein the tactile means further includes a means for slidably contacting the touchscreen display along a predetermined linear slot.

13. The apparatus of claim 12 wherein the membrane comprises a flexible and resilient material.

14. The apparatus of claim 12 wherein the tactile means comprises a translucent portion.

15. The apparatus of claim 12 wherein the tactile means comprises a haptic structure configured to emit an audible sound.

16. The apparatus of claim 12 wherein the tactile means comprises a plurality of button structures disposed on the membrane, wherein the plurality of button structures implement a QWERTY keyboard.

17. The apparatus of claim 12 further comprising a lighting device to selectively illuminate a portion of the apparatus.

* * * * *